(12) United States Patent
Joseph et al.

(10) Patent No.: US 9,612,924 B1
(45) Date of Patent: Apr. 4, 2017

(54) FAULT TOLERANCE IN A DISTRIBUTED FILE SYSTEM

(71) Applicant: Amazon Technologies, Inc., Reno, NV (US)

(72) Inventors: Rejith George Joseph, Seattle, WA (US); Tin-Yu Lee, Seattle, WA (US); Bandish N. Chheda, Seattle, WA (US); Scott Michael Le Grand, Soquel, CA (US); Saurabh Dileep Baji, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 177 days.

(21) Appl. No.: 14/314,969

(22) Filed: Jun. 25, 2014

(51) Int. Cl.
 *G06F 11/00* (2006.01)
 *G06F 11/20* (2006.01)
 *G06F 9/455* (2006.01)

(52) U.S. Cl.
 CPC ...... *G06F 11/2007* (2013.01); *G06F 9/45533* (2013.01); *G06F 2009/45591* (2013.01)

(58) Field of Classification Search
 CPC .................................................. G06F 11/2007
 See application file for complete search history.

(56) References Cited

U.S. PATENT DOCUMENTS

| | | | | |
|---|---|---|---|---|
| 7,213,246 B1 * | 5/2007 | van Rietschote | ... | G06F 11/1482 707/999.202 |
| 8,335,902 B1 * | 12/2012 | Feathergill | .......... | G06F 11/1466 711/161 |
| 8,499,191 B2 * | 7/2013 | Shimada | ............ | G06F 11/1662 714/4.11 |
| 9,268,642 B2 * | 2/2016 | Krishnan | ............ | G06F 11/1415 |
| 2010/0306495 A1 * | 12/2010 | Kumano | ................. | G06F 3/061 711/170 |
| 2011/0191628 A1 * | 8/2011 | Noguchi | ................. | G06F 11/16 714/6.2 |
| 2013/0117359 A1 * | 5/2013 | Husain | .................... | G06F 9/445 709/203 |
| 2015/0052524 A1 * | 2/2015 | Raghu | ..................... | G06F 9/455 718/1 |
| 2016/0055067 A1 * | 2/2016 | Bensinger | ........... | G06F 11/1451 714/19 |

\* cited by examiner

*Primary Examiner* — Christopher McCarthy
(74) *Attorney, Agent, or Firm* — Klarquist Sparkman, LLP

(57) ABSTRACT

A method for providing fault tolerance in a distributed file system of a service provider may include launching at least one data storage node on at least a first virtual machine instance (VMI) running on one or more servers of the service provider and storing file data. At least one data management node may be launched on at least a second VMI running on the one or more servers of the service provider. The at least second VMI may be associated with a dedicated IP address and the at least one data management node may store metadata information associated with the file data in a network storage attached to the at least second VMI. Upon detecting a failure of the at least second VMI, the at least one data management node may be re-launched on at least a third VMI running on the one or more servers.

12 Claims, 10 Drawing Sheets

410

FAULT TOLERANCE IN A DISTRIBUTED FILE SYSTEM

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs.

With the increased use of cloud computing resources, some cloud computing environments may be inefficient in managing resource allocation. Additionally, multiple application installations and reboots may cause latencies, contributing to the inefficient use of the cloud computing environment resources as well as difficulties in providing fault tolerance for data processing resources.

BRIEF DESCRIPTION OF THE DRAWINGS

Various embodiments in accordance with the present disclosure will be described with reference to the drawings, in which.

DETAILED DESCRIPTION

Figure 1:
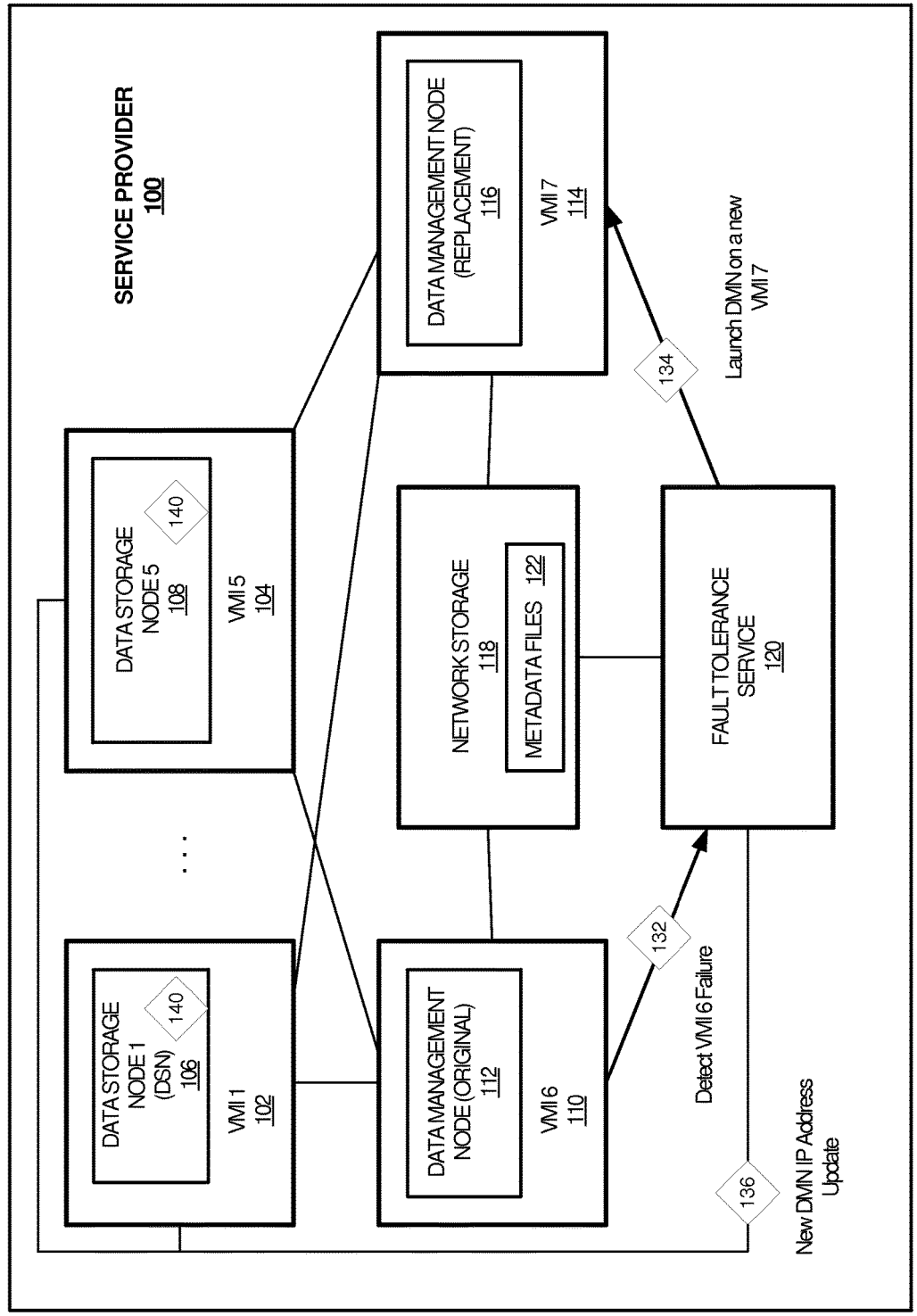
FIG. 1 is a diagram of an example network environment supporting fault tolerance for a data management node of a distributed file system, in accordance with an embodiment of the disclosure.

A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment. As used herein, the terms "virtual machine" and "virtual machine instance" are interchangeable.

As used herein, the term "fault tolerance" refers to the ability of a computing environment (e.g., a data processing network environment) to continue operating properly (e.g., according to one or more specifications) in the event of failure of one or more components (e.g., failure or unavailability of one or more network nodes in the computing environment).

As used herein, the term "distributed file system" refers to a file system designed to hold a large amount of data, while providing high throughput access to the information. The files of the distributed file system are stored in a redundant fashion across multiple nodes to ensure durability and easy access to data. In some instances a distributed file system may also be known as a network file system, using a network protocol to access the file data. Additionally, files may be divided into parts (or blocks), with multiple copies of each block being stored across multiple nodes. The file blocks may be accessed using the same interfaces and semantics as when accessing local files (e.g., mounting/unmounting, listing directories, read/write at byte boundaries, native permission models, and so forth). Examples of distributed file systems may include the Google File System (GFS), the Apache Software Foundation's Hadoop Distributed File System (HDFS), Inktank's Ceph, the Moose File System (MooseFS), Windows Distributed File System (DFS), Fraunhofer Parallel File System (FhGFS or Fraunhofer FS), Red Hat's GlusterFS, Lustre, Ibrix, and so forth.

As used herein, the term "data storage node" refers to a node in a distributed file system, which is used for storing file data (e.g., one or more file blocks for at least one file). For example, a DataNode in HDFS may be considered an example of a data storage node.

As used herein, the term "data management node" refers to a node that stores and manages (e.g., updates existing entries, adds new entries, deletes entries, etc.) all the metadata information associated with the distributed file system. Examples of such metadata information may include directory tree information, file names, file blocks identification (file block IDs), file blocks location, file block mapping to IDs, file/blocks access permissions, file checksums, and so forth. For example, a NameNode in HDFS may be considered an example of a data management node. In some instances, a distributed file system may have multiple data storage nodes and a single data management node.

The following description is directed to techniques and solutions supporting fault tolerance in a distributed file system. A service provider may use a plurality of virtual machines to run nodes in a distributed file system configuration. For example, to provide fault tolerance in instances of failure of a data management node, a storage volume (e.g., a network storage drive) may be mounted to the virtual machine instance (VMI) used to run the data management node. The storage volume may be used to store the metadata information of the distributed file system. If the data management node fails (e.g., the node becomes unresponsive for a certain time period), a new VMI may be launched and may be used to run the data management node. The storage volume may then be simply re-attached to the data management node after the new VMI is launched. In this regard, the integrity and availability of the metadata information may be insured in case the data management node experiences failure, thereby providing fault tolerance in the distributed file system.

Similar fault tolerance solution may be provided to avoid failure of a data storage node and the use of valuable network resources to replicate any missing file data that has been stored on the failed data storage node. More specifically, a storage volume may be attached (e.g., mounted) to a data storage node and may be used to copy the file data (e.g., file blocks) stored by the file storage node. If the file storage node fails, a new VMI may be launched and may be used to run a new storage node. The storage volume may be disconnected from the failed node and attached to the new storage node. The data management node may be notified (e.g., via a handshake upon starting the new data storage node) of the file data blocks available at the new data storage node.

Figure 4:
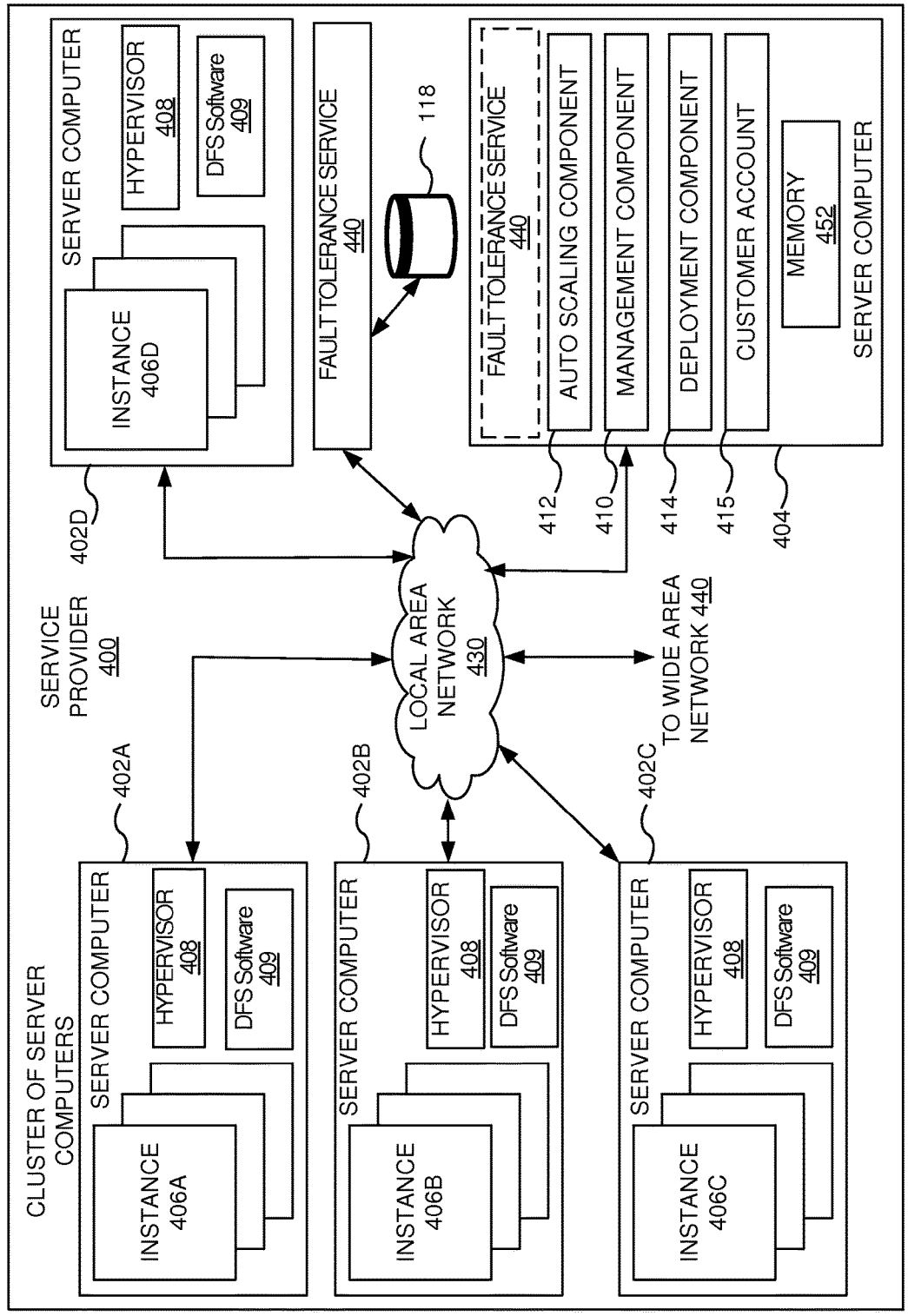
FIG. 4 is an example system diagram showing a plurality of virtual machine instances running in a multi-tenant environment, using a fault tolerance service, in accordance with an example embodiment of the disclosure.

FIG. 1 is a diagram of an example network environment supporting fault tolerance for a data management node of a distributed file system, in accordance with an embodiment of the disclosure. Referring to FIG. 1, the service provider 100 (which is discussed in greater detail in reference to FIG. 4 below) may be a multi-tenant cloud network environment where one or more clients may run one or more virtual machine instances (VMIs) (e.g., 102, ..., 104, 110, 114) on one or more of server computers (e.g., as illustrated in FIG. 4). The service provider 100 may further comprise network storage 118 and fault tolerance service 120. The network storage 118 may comprise a storage volume, which can be mounted by one of the VMIs (i.e., after the mounting, the storage volume may appear as an external hard drive to the VMI's operating system), and may be used for storing data.

The fault tolerance service 120 may comprise suitable logic, circuitry, interfaces, and/or code and may be operable to fault tolerance-related functionalities within the service provider 100. For example, the fault tolerance service 100 may be configured to launch or deactivate VMIs, run nodes (e.g., data management nodes and data storage nodes) for implementing a distributed file system, mount one or more storage volumes to VMIs, detect failure of nodes and launch replacement nodes, and so forth.

The VMIs may be used to run one or more nodes, implementing a distributed file system. For example, the VMIs 102, ..., 104 may be used to run data storage nodes (DSNs) 106, ..., 108, respectively, and VMI 110 may be used to run a data management node (DMN) 112.

Figure 2A:
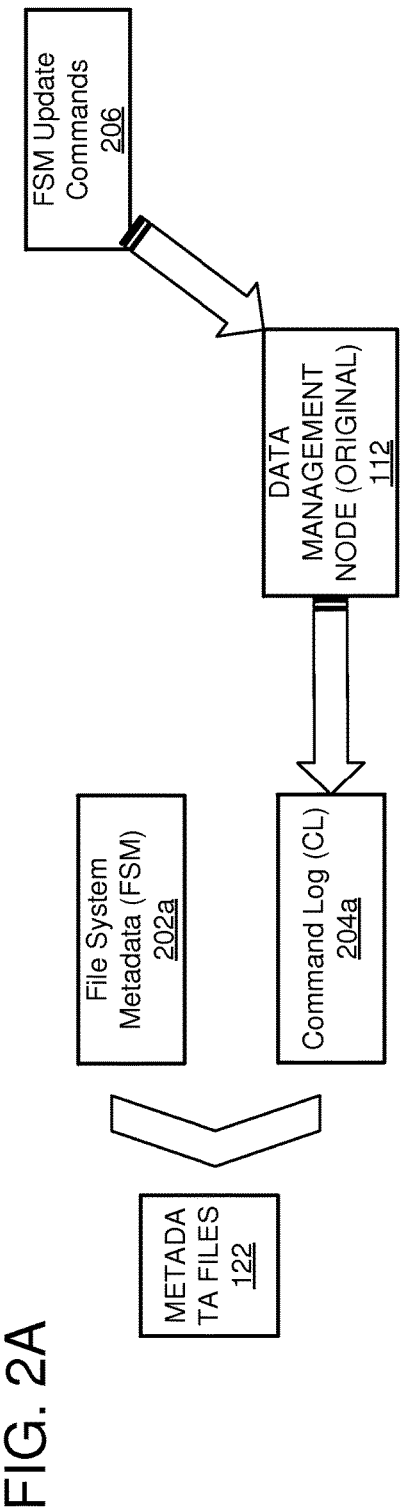
FIG. 2A is a block diagram of example metadata files, which may be used for fault tolerance, in accordance with an embodiment of the disclosure.

In operation, the fault tolerance service 120 may mount a storage volume (e.g., network storage 118) to the VMI 110 for use by the data management node 112. The DMN 112 may use the network storage 118 to store metadata files 122. FIG. 2A is a block diagram of example metadata files, which may be used for fault tolerance, in accordance with an embodiment of the disclosure. Referring to FIGS. 1-2A, the metadata files 122 may include file system metadata (FSM) 202a and a command log (CL) 204a. The FSM 202a may include, for example, directory tree information, file names, file blocks identification (file block IDs), file blocks location, file block mapping to IDs, file/blocks access permissions, file checksums, and other metadata associated with the distributed file system that includes DSNs 106, ..., 108 and DMN 112.

Figure 2B:
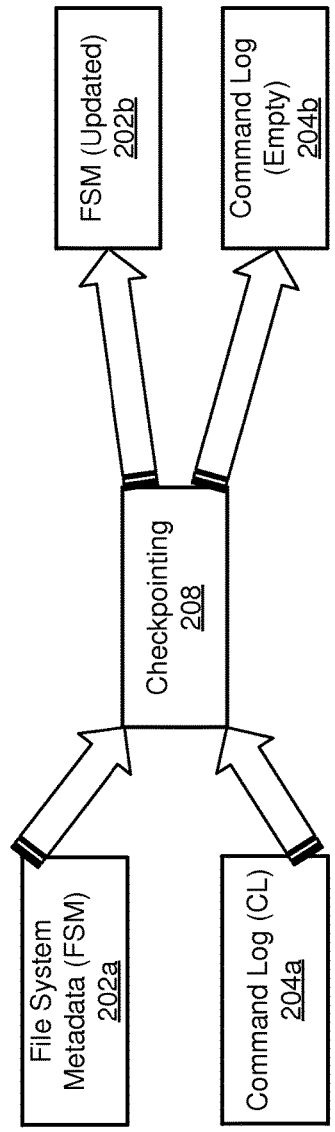
FIG. 2B is a block diagram of an example checkpointing process for updating file system metadata, in accordance with an embodiment of the disclosure.

The command log 204a may include a list of commands associated with updates to the FSM 202a. For example, the data management node 112 may receive FSM update commands 206, which may be stored in the command log 204a for subsequent execution (e.g., during a checkpointing process 208 as illustrated in FIG. 2B). The commands 206 may include, FSM edit commands for existing metadata (e.g., renaming a file), adding new metadata (e.g., adding a new file), deleting existing metadata (e.g., deleting a file), and so forth. In an example file addition event, the data management node 112 may receive the new file along with the FSM update command 206 (e.g., add a new file), divide the new file into blocks, and store each block in one of the DSNs 106, ..., 108. The CL 204a can then be updated to include all instructions associated with processing the new file metadata—e.g., adding identification for all new file blocks and identification of the DSNs storing them into the FSM 202a.

Since the command log 204a includes pending (unexecuted) commands associated with the FSM 202a, the DMN 112 (or the fault tolerance service 120) may periodically perform checkpointing to update the FSM 202a with all pending commands from the CL 204a. FIG. 2B is a block diagram of an example checkpointing process for updating file system metadata, in accordance with an embodiment of the disclosure. Referring to FIGS. 1-2B, during a checkpointing procedure 208, the DMN 112 may read all unperformed commands from the CL 204a and apply them to the FSM 202a. In this regard, a new and updated FSM 202b may be generated. Since the pending commands from the CL 204a have been executed during the checkpointing 208, a new CL 204b may be generated, which will be empty. In an example embodiment, only a single CL (e.g., 204a) may be used, which may keep a running list of all commands entered for updating the FSM 202a. In this regard, if checkpointing 208 is performed, all executed/performed FSM update commands may be marked in the CL 204a as being executed/performed (e.g., by activating a flag for each command entry).

The DMN 112 may identify (e.g., in a setting) the network storage 118 as the location where the metadata files 122 are stored. In operation, the fault tolerance service 120 may detect that the DMN 112 is unresponsive. For example, the fault tolerance service 120 may detect (at 132) that the DMN 112 has failed (e.g., DMN 112 is unresponsive to one or more instructions related to processing of data files within the distributed file system). The failure of the DMN 112 may be due to unresponsiveness of the DMN itself or failure/unavailability of the VMI 110 used to run the DMN 112. After the fault tolerance service 120 detects that the DMN 112 has failed, a new VMI 114 may be launched (at 134) and a replacement DMN 116 may be run at the new VMI 114. In this regard, the fault tolerance service 120 (or another service of the service provider 100) may ensure that the necessary code (e.g., software for running DMN or DSN) is installed after a VMI is launched, so that a new node can be run after the VMI is launched. In some instances, the code for running DMN or DSN can be part of the hypervisor or software kernel of a host server used for launching the VMI.

After the new (replacement) DMN 116 is launched on VMI 114, the fault tolerance service 120 may disconnect the network storage 118 from the VMI 110 and attach it (e.g., mount it) to the replacement DMN 116. The DMN 116 may then access the file system metadata 202a and the command log 204a within the metadata files 122 in order to retrieve the metadata associated with the files stored by the DSNs 106, ..., 108. In some instances, the replacement DMN 116 may perform checkpointing (208) to update the file system metadata 202a with all unexecuted commands stored in the command log 204a.

Each of the DSNs 106, . . . , 108 may store an address or a uniform resource identifier (URI) identifying the DMN of the distributed file system. Such URI may be stored in a configuration record 140 and may include at least one of a protocol identifier (i.e., communication protocol used by the DMN), a host name (e.g., IP address of the VMI running the DMN), or an access port associated with the DMN. After the replacement DMN 116 is launched on VMI 114, the new IP address 136 of VMI 114 may be communicated to each of the DSNs 106, . . . , 108 and saved in their configuration record 140. The fault tolerance service 120 120 may then restart the DSNs 106, . . . , 108 so that a "handshake" (or connection) to the replacement DMN 116 may be established using the updated IP address 136 in each configuration record of the DSNs.

In an example embodiment, the DMN 112 may be associated with a dedicated IP address (e.g., an IP address assigned to a customer, which may be used for addressing a VMI running the DMN of a distributed file system of the customer). More specifically, each of the configuration records 140 may store the dedicated IP address as the DMN's IP address (or the IP address of the VMI running the DMN). Upon detecting the failure of DMN 112 and re-launching a new VMI 114, the dedicated IP address may be re-assigned to the new VMI 114. In this regard, there will be no need for the fault tolerance service 120 to update each configuration record 140 with a new IP address of the new VMI running the replacement DMN 116.

Figure 3:
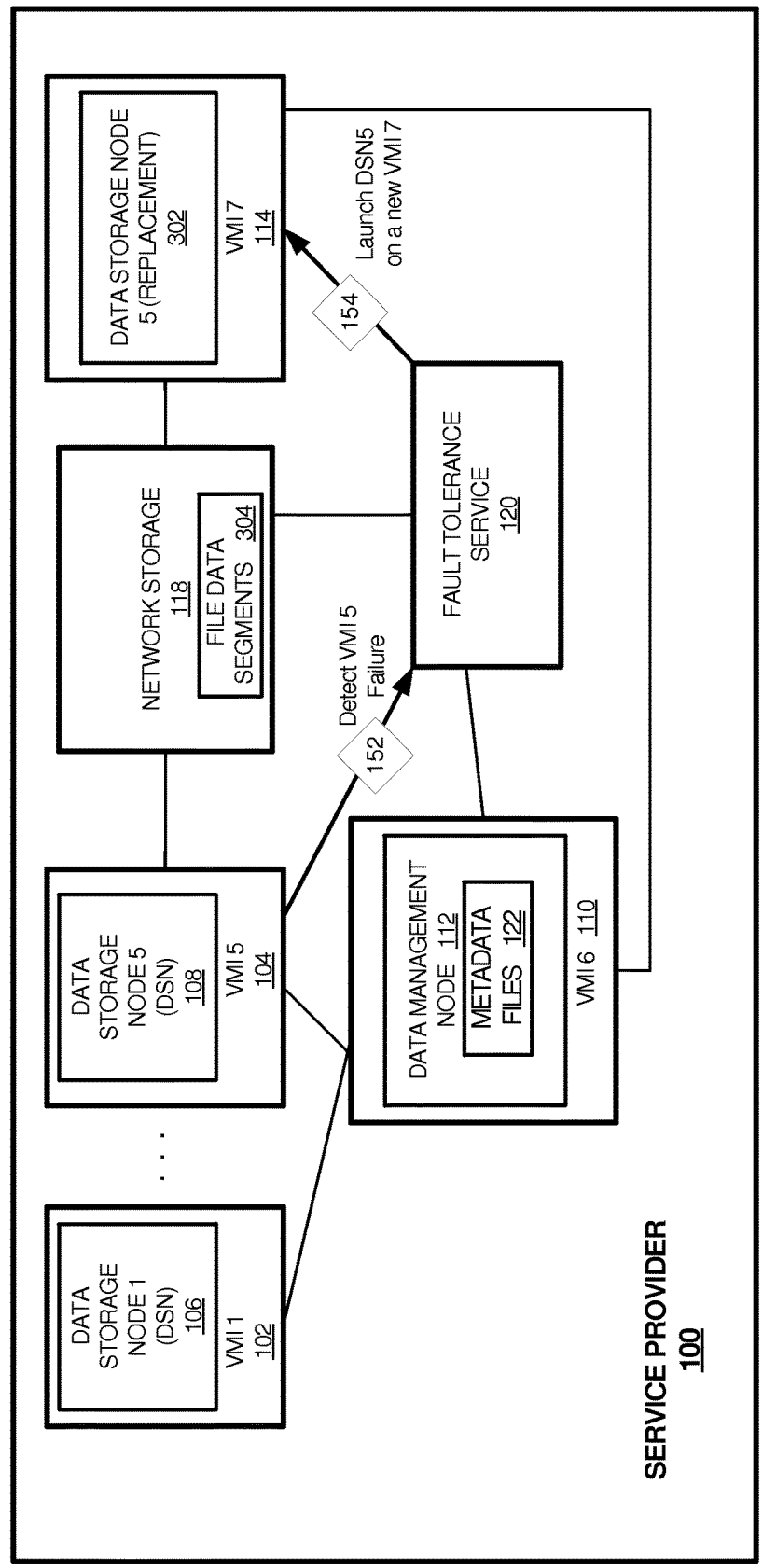
FIG. 3 is a diagram of an example network environment supporting fault tolerance for a data storage node of a distributed file system, in accordance with an embodiment of the disclosure.

In a particular implementation, the distributed file system of the service provider 100 (e.g., as illustrated in FIGS. 1-3) may be a Hadoop Distributed File System. In this regard, the data storage nodes 106, . . . , 108 may be Hadoop DataNodes, and the data management node (112 or 116) may be Hadoop NameNode. Additionally, the file system metadata 202a (of the metadata files 122) may include the Hadoop fsimage file, and the Command Log 204a may include the Hadoop editlog file, both of which are stored in a Hadoop directory dfs.name.dir at the NameNode. The configuration record 140 may be stored in a Hadoop directory fs.default-.name at each of the DataNodes 106, . . . , 108.

FIG. 3 is a diagram of an example network environment supporting fault tolerance for a data storage node of a distributed file system, in accordance with an embodiment of the disclosure. Referring to FIG. 3, there is illustrated a service provider 100 implementing a distributed file system using DSNs 106, . . . , 108 and DMN 112 (similar to the distributed file system of FIG. 1). In accordance with an example embodiment of the disclosure, the fault tolerance service 120 may be used to provide fault tolerance not only in instances of failure of the DMN (as shown in FIG. 1), but also in instances of failure of one or more of the data storage nodes 106, . . . , 108.

More specifically, the fault tolerance service 120 may attach the network storage 118 to the VMI 104 and the DSN 108, and the network storage 118 may be used to store the file data segments (or blocks) 304 designated for storage by the DSN 108. More specifically, each configuration record 140 of a DSN may store a path to the location where the DSN should store the file data segments 304. In this regard, the configuration record 140 for DSN 108 may indicate that all data segments should be stored in the network storage 118. In some instances, the configuration record 140 may indicate that file data segments 304 should be stored at the DSN 108 (e.g., local storage associated with the VMI 104) as well as at the network storage 118.

If the fault tolerance service 120 detects (at 152) that the DSN 108 has failed (e.g., DSN 108 is unresponsive to one or more instructions related to processing of data files within the distributed file system, such as data segment access or storage instruction). The failure of the DSN 108 may be due to unresponsiveness of the DSN itself or failure/unavailability of the VMI 104 used to run the DSN 108. After the fault tolerance service 120 detects that the DSN 108 has failed, a new VMI 114 may be launched (at 154) and a replacement DSN 302 may be run at the new VMI 114. In this regard, the fault tolerance service 120 (or another service of the service provider 100) may ensure that the necessary code (e.g., software for running DMN or DSN) is installed after a VMI is launched, so that a new node can be run on the VMI after the VMI is launched.

After the new (replacement) DSN 302 is launched on VMI 114, the fault tolerance service 120 may disconnect the network storage 118 from the VMI 104 and attach it (e.g., mount it) to the replacement DSN 302. The DMN 112 may then access the file data segments 304 from the network storage 118 via the replacement DSN 302 running on VMI 114.

FIG. 4 is an example system diagram showing a plurality of virtual machine instances running in a multi-tenant environment, using a fault tolerance service, in accordance with an example embodiment of the disclosure. More specifically, FIG. 4 is a computing system diagram of a network-based service provider 400 that illustrates one environment in which embodiments described herein can be used. By way of background, the service provider 400 (i.e., the cloud provider) is capable of delivery of computing and storage capacity as a service to a community of end recipients (e.g., tenants or customers). The service provider 400 may be the same as the service provider 100 illustrated in FIGS. 1-3.

In an example embodiment, the service provider 400 can be established for an organization by or on behalf of the organization. That is, the service provider 400 may offer a "private cloud environment." In another embodiment, the service provider 400 supports a multi-tenant environment, wherein a plurality of customers operate independently (i.e., a public cloud environment). Generally speaking, the service provider 400 can provide the following models: Infrastructure as a Service ("IaaS"), Platform as a Service ("PaaS"), and/or Software as a Service ("SaaS"). Other models can be provided. For the IaaS model, the service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the service provider platform without the cost of buying and managing the underlying hardware and software. The SaaS model allows installation and operation of application software in the service provider. In some embodiments, end users access the service provider 400 using networked customer devices, such as desktop computers, laptops, tablets, smartphones, etc. running web browsers or other lightweight customer applications. Those skilled in the art will recognize that the service provider 400 can be described as a "cloud" environment.

The particular illustrated service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e., a computer) that executes applications like a physical machine. In the example, each of the server computers 402A-402D can be configured to execute a hypervisor 408 or another type of program configured to enable the execution of multiple instances 406 on a single server. For example, each of the servers 402A-402D can be configured (e.g., via the hypervisor 408) to support one or more virtual machine partitions, with each virtual machine partition capable of running a virtual machine instance (e.g., server computer 402A could be configured to support three virtual machine partitions each running a corresponding virtual machine instance). Additionally, each of the instances 406 can be configured to execute one or more applications.

In an example embodiment, each of the server computers 402A-402D may also comprise distributed file system (DFS) software 409, which may be used by one or more of the instances 406 to run nodes in connection with a distributed file system. For example, the DFS software 409 may be used to run one or more data storage nodes (DSNs) and/or data management nodes (DMNs), as illustrated in FIGS. 1-3.

Figure 5:
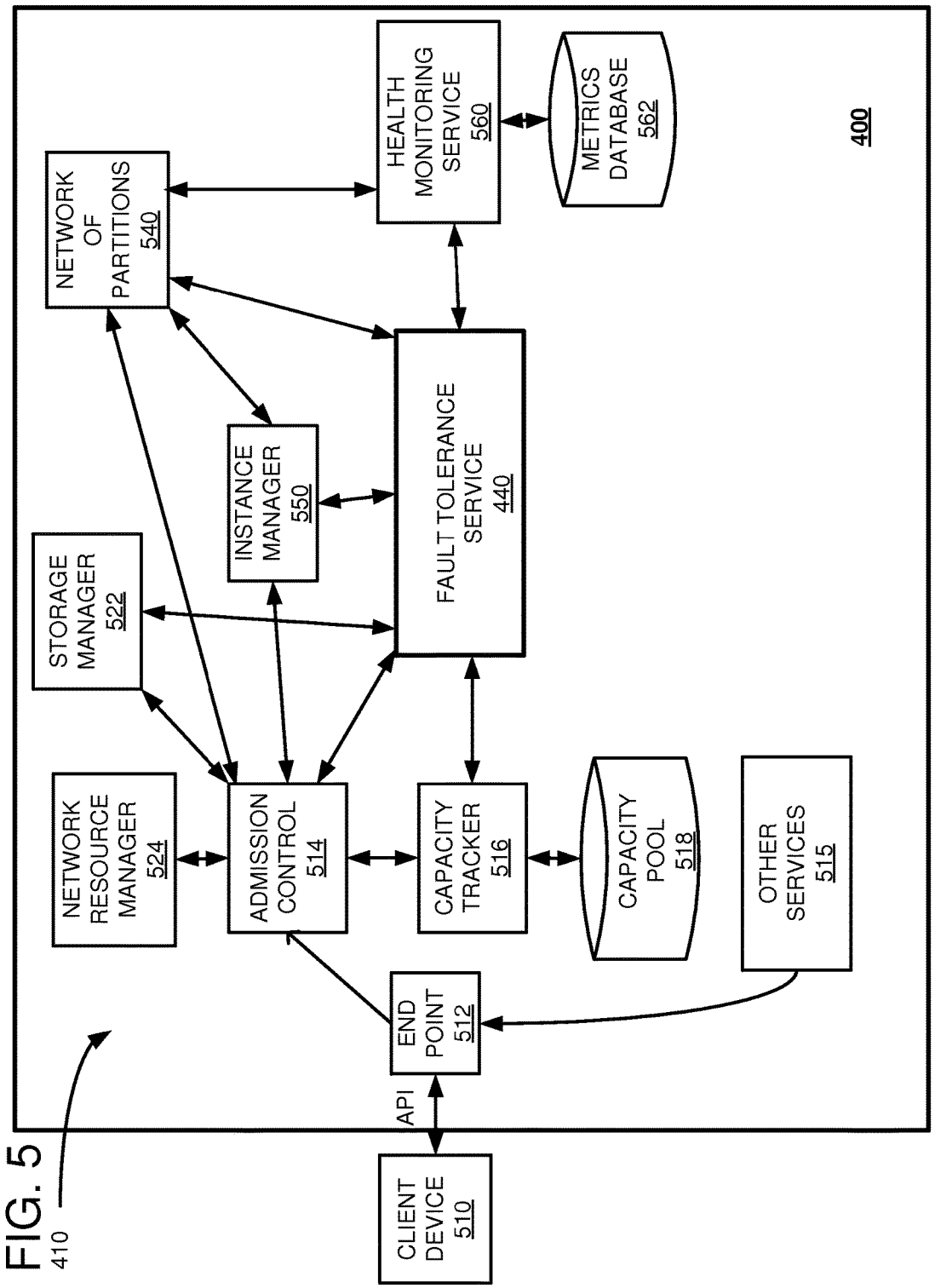
FIG. 5 shows further details of an example system including a plurality of management components associated with a control plane, which may be used to provide fault tolerance according to one embodiment.

The service provider 400 may also comprise a fault tolerance service 440, which may have the functionalities described herein in connection with fault tolerance service 120. The fault tolerance service 440 may be implemented as a stand-alone service within the provider 400, as a dedicated server (similar to the servers 402A-402D), and/or may be implemented as part of the server computer 404 that performs management functions. For example, the fault tolerance service 440 may be implemented as part of the management component 410 (as seen in FIG. 5). Additionally, the fault tolerance service 440 may use one or more network storage volumes 118 to implement the fault tolerance functionalities described herein.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402, the instances 406, the hypervisors 408, and/or the fault tolerance service 440. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand.

The server computer 404 may further comprise memory 452, which may be used as processing memory by the fault tolerance service 440. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager (e.g., 550 in FIG. 5) can be considered part of the deployment component 414.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 430 can be utilized to interconnect the server computers 402A-402D and the server computer 404. The network 430 can be a local area network (LAN) and can be connected to a Wide Area Network (WAN) 440 so that end-users can access the service provider 400. It should be appreciated that the network topology illustrated in FIG. 4 has been simplified and that many more networks and networking devices can be utilized to interconnect the various computing systems disclosed herein.

FIG. 5 shows further details of an example system including a plurality of management components associated with a control plane, which may be used to provide fault tolerance according to one embodiment. More specifically, FIG. 5 illustrates in further detail the management component 410, which may implement the fault tolerance service 440 within the multi-tenant environment of the service provider 400.

In order to access and utilize instances (such as instances 406 of FIG. 4), a customer device can be used. The customer device 510 can be any of a variety of computing devices, mobile or otherwise, including a cell phone, smartphone, handheld computer, Personal Digital Assistant (PDA), desktop computer, etc. The customer device 510 can communicate with the service provider 400 through an end point 512, which can be a DNS address designed to receive and process application programming interface (API) requests. In particular, the end point 512 can be a web server configured to expose an API. Using the API requests, a customer device 510 can make requests to implement any of the functionality described herein (e.g., accessing file data managed by the DMN 112/116). Other services 515, which can be internal to the service provider 400, can likewise make API requests to the end point 512. The API requests from the client can pass through the admission control 514 and onto the fault tolerance service 440 in order to access file data-related functionalities of the distributed file system and/or change one or more settings of the fault tolerance service 440 (e.g., replication parameters designating a number of copies that the DSN have to maintain for each file block, and so forth).

Other general management services that may or may not be included in the service provider 400 (and/or within the management component 410) include an admission control 514, e.g., one or more computers operating together as an admission control web service. The admission control 514 can authenticate, validate and unpack the API requests for service or storage of data within the service provider 400. The capacity tracker 516 is responsible for determining how the servers need to be configured in order to meet the need for the different instance types by managing and configuring physical inventory in terms of forecasting, provisioning, and real-time configuration and allocation of capacity. The capacity tracker 516 maintains a pool of available inventory in a capacity pool database 518. The capacity tracker 516 can also monitor capacity levels so as to know whether resources are readily available or limited.

An instance manager 550 controls launching and termination of virtual machine instances in the network. When an instruction is received (such as through an API request) to launch an instance, the instance manager 550 pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6, and includes a physical layer upon which the instances are launched.

A health monitoring service 560 can provide monitoring for resources and the applications customers run on the service provider 400. System administrators can use the monitoring service 560 to collect and track metrics, and gain insight to how applications are running. For example, the monitoring service 560 can allow system-wide visibility into application performance and operational health. Metrics generated by the health monitoring service 560 can be stored in the metrics database 562. In an example embodiment, the fault tolerance service 440 may be part of the health monitoring service 560.

The fault tolerance service 440 may perform the fault tolerance and distributed file system related functionalities described herein. The fault tolerance service 440 may communicate with the capacity tracker 516 to receive information regarding available partitions and/or host servers that can be used for launching an instance (e.g., to launch a replacement DMN or DSN for fault tolerance). Additionally, communications with the admission control 514, the storage manager 522, and the network of partitions 540 may be used to launch (or re-launch) an instance in accordance with a fault tolerance functionalities described herein.

Figure 6:
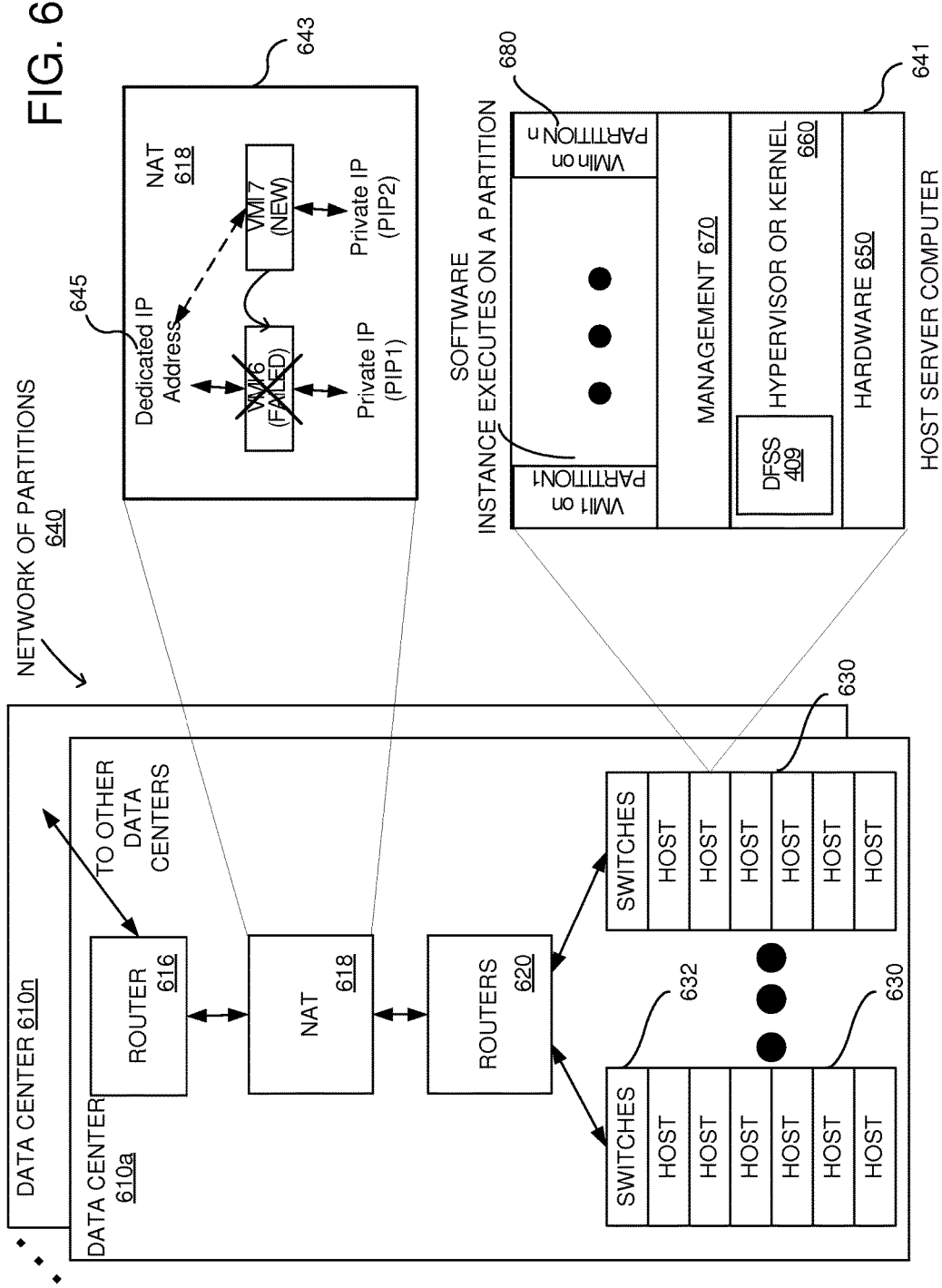
FIG. 6 shows an example of a plurality of host computers, routers, and switches—which are hardware assets used for running virtual machine instances—with the host computers having fault tolerance-related functionalities that may be configured according to one embodiment.

FIG. 6 shows an example of a plurality of host computers, routers, and switches—which are hardware assets used for running virtual machine instances—with the host computers having fault tolerance-related functionalities that may be configured according to one embodiment. More specifically, FIG. 6 illustrates the network of partitions 640 and the physical hardware associated therewith. The network of partitions 640 can include a plurality of data centers, such as data centers 610a, . . . , 610n, coupled together by routers, such as router 616.

The router 616 reads address information in a received packet and determines the packet's destination. If the router decides that a different data center contains a host server computer, then the packet is forwarded to that data center. If the packet is addressed to a host in the data center 610a, then it is passed to a network address translator (NAT) 618 that converts the packet's public IP address to a private IP address. The NAT 618 also translates private addresses to public addresses that are bound outside of the data center 610a. Additional routers 620 can be coupled to the NAT 618 to route packets to one or more racks 630 of host server computers. Each rack 630 can include a switch 632 coupled to multiple host server computers. A particular host server computer is shown in an expanded view at 641.

Each host 641 has underlying hardware 650. Running a layer above the hardware 650 is a hypervisor or kernel layer 660. The hypervisor or kernel layer 660 can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used. In an example embodiment, the hypervisor layer 660 may include the DFS software 409, which may be used to install DSNs or DMNs, as described herein.

A management layer 670 can be part of the hypervisor or separated therefrom, and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system (e.g., VMI1 may be running on partition 1 and VMIn may be running on partition n). As such, each partition 680 is an abstract portion of capacity designed to support its own virtual machine independent of the other partitions.

Any applications executing on the instances can be monitored using the management layer 670, which can then pass the metrics to the health monitoring service 560 for storage in the metrics database 562. Additionally, the management layer 670 can pass to the monitoring service 560 the number of instances that are running, when they were launched, the operating system being used, the applications being run, etc. All such metrics can be used for consumption by the health monitoring service 560 and stored in database 562.

Additionally, when the fault tolerance service 120 (or 440) performs fault tolerance in connection with a failed DMN 112 (running on VMI6 110), the NAT 618 may be used to assign the same dedicated (public) IP address to the replacement VMI7 114. This is illustrated at the expanded view 643 of the NAT 618. As seen at 643, even though each VMI 110 and 114 (or each server running the VMI) may be associated with its own private IP address (PIP1 and PIP2), after the replacement DMN 116 is launched on VMI 114, the dedicated IP address 645 is assigned to the replacement VMI 114. In an example embodiment, the dedicated IP address 645 may be part of a virtual network interface associated with one or more of the VMIs (e.g., VMI6). In addition to the dedicated public IP address, such virtual network interface may also provide one or more dedicated private IP addresses, one or more security groups, a MAC address, a source/destination check flag, and so forth. In this regard, if the private IP address PIP1 is part of the virtual network interface for VMI6 (together with the dedicated public IP address, the private IP address PIP1 may also be dedicated to VMI6). Consequently, after the replacement DMN 116 is launched on VMI 114, the dedicated IP address 645 as well as the dedicated private IP address PIP1 are both assigned to the replacement VMI 114.

Figure 7:
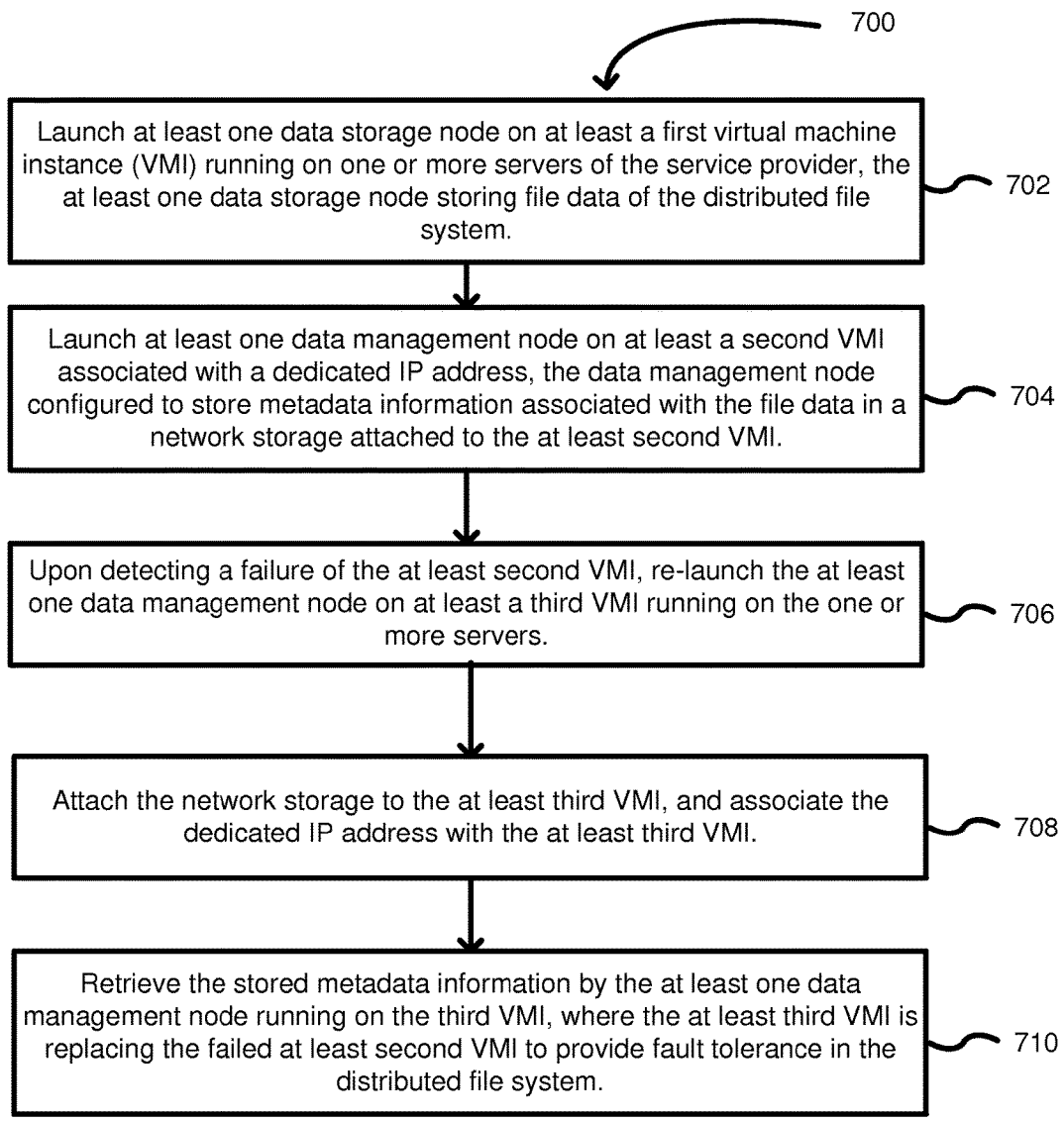
FIGS. 7-9 are flowcharts of example methods of providing fault tolerance in a distributed file system of a service provider, in accordance with an embodiment of the disclosure.

FIG. 7 is a flowchart of an example method of providing fault tolerance in a distributed file system of a service provider, in accordance with an embodiment of the disclosure. Referring to FIGS. 1-2B and 7, at 702, the fault tolerance service 120 may launch at least one data storage node (e.g., 106, . . . , 108) on at least a first virtual machine instance (VMIs 102, . . . , 104) running on one or more servers of the service provider (100). The at least one data storage node (DSNs 106, . . . , 108) may be used to store file data of a distributed file system. At 704, the fault tolerance service 120 may launch at least one data management node (e.g., DMN 112) on at least a second VMI (e.g., VMI 110) running on the one or more servers of the service provider. The at least second VMI (110) may be associated with a dedicated IP address. For example, the VMI 110 (or the DMN 112) may be assigned a dedicated IP address 645 (FIG. 6).

The at least one data management node (DMN 112) may be configured to store metadata information (e.g., metadata files 122) associated with the file data in a network storage (e.g., 118) attached to the at least second VMI (VMI 110). At 706, the fault tolerance service 120 may detect failure of the at least second VMI (VMI 110) and may re-launch the at least one data management node (re-launched as DMN 116) on at least a third VMI (e.g., VMI 114) running on the one or more servers. The at least third VMI (114) may be replacing the failed at least second VMI (110) to provide fault tolerance in the distributed file system of the service provider 100 (e.g., the distributed file system comprising the DSNs 106, . . . , 108, DMNs 112, 116, network storage 118, and fault tolerance service 120).

At 708, the fault tolerance service 120 may attach the network storage 118 to the at least third VMI (VMI 114). The fault tolerance service 120 may associate the dedicated IP address (e.g., dedicated IP address 645) with the at least third VMI (VMI 114). At 710, the fault tolerance service 120 may cause the DMN 116 to retrieve the stored metadata information (122). The metadata information (122) may include file system metadata (202a) and a command log (204a). The file system metadata 202a may include for each file in the file data, at least one of a file name of the file, a file checksum of the file, information identifying one or more file blocks of the file, information identifying one or more file directories storing each of the file blocks, or information identifying one or more of the at least one data storage nodes hosting the identified one or more file directories. The command log 204a may include at least one instruction for updating the file system metadata 202a.

Upon re-launching the at least one data management node (as DMN 116) on the at least third VMI (VMI 114), the fault tolerance service 120 may perform checkpointing (208) of the metadata information (122) by updating the file system metadata (202a) based on the at least one instruction in the command log (204a). The command log may be reset after the checkpointing by deleting the at least one instruction and creating a clean/empty log (204b).

Upon launching the at least one data management node (as DMN 116) on the at least second VMI (114), the fault tolerance service 120 may mount the network storage (118) as an external volume attached to the at least second VMI (114). The fault tolerance service 120 may store an address (e.g., a dedicated IP address 645) associated with the at least one data management node (116) in a configuration record (e.g., 140) for the at least one data storage node (106, . . . , 108).

Detecting the failure of the at least second VMI (110) includes detecting inactivity by the at least one data management node (112) for a duration of time, where the inactivity is in response to the at least one data management node (112) receiving at least one instruction associated with the file data.

Figure 8:
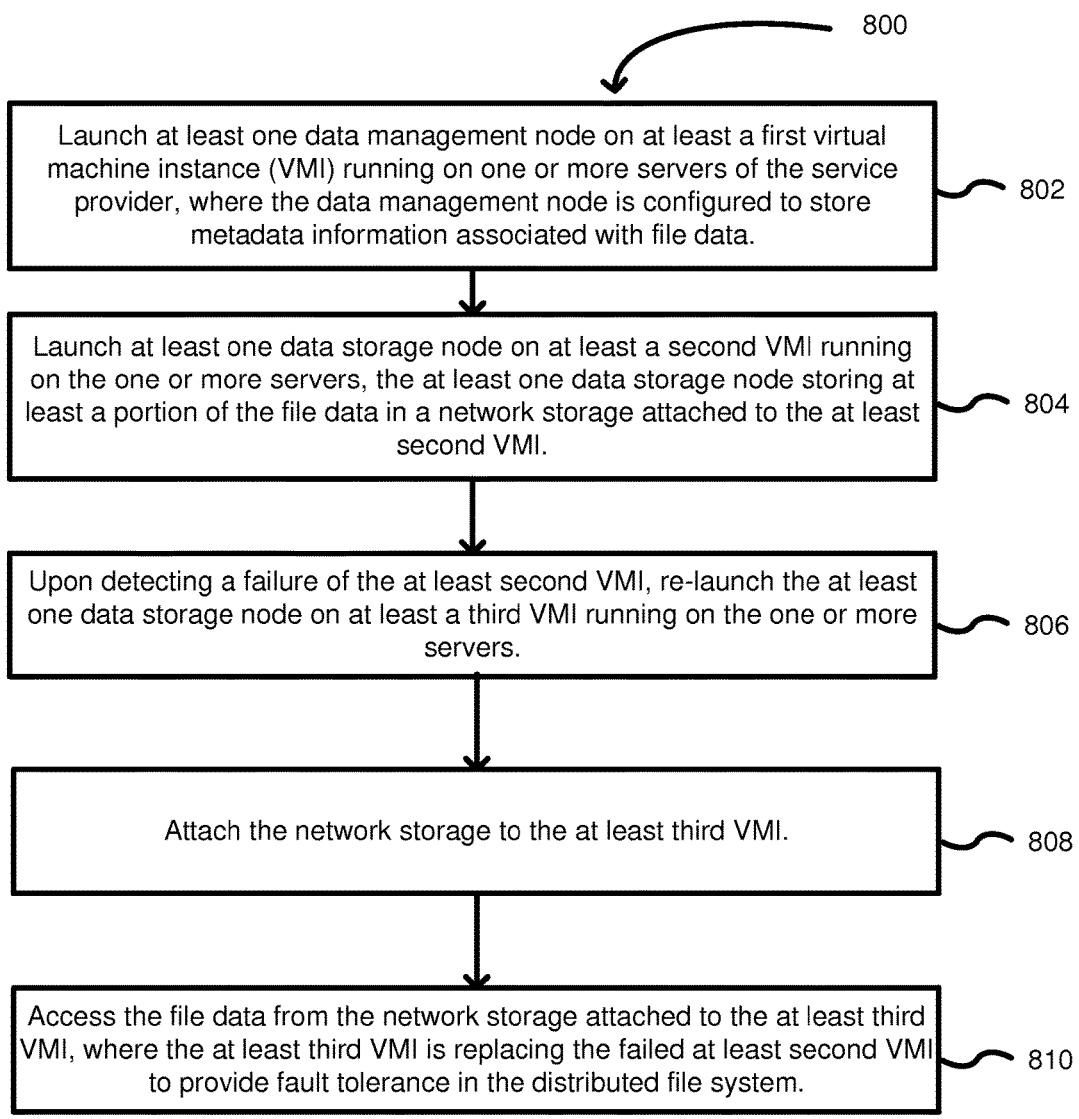

FIG. 8 is a flowchart of another example method of providing fault tolerance in a distributed file system of a service provider, in accordance with an embodiment of the disclosure. Referring to FIGS. 3 and 8, the example method 800 may start at 802, when the fault tolerance service 120 may launch at least one data management node (112) on at least a first virtual machine instance (VMI 110) running on one or more servers of the service provider 100. The at least one data management node (112) may be configured to store metadata information (e.g., 122) associated with file data of the distributed file system. At 804, the fault tolerance service 120 may launch at least one data storage node (e.g., 108) on at least a second VMI (e.g., 104) running on the one or more servers of the service provider. The at least one data storage node (108) may store at least a portion of the file data (e.g., file data segments 304) in a network storage (118) attached to the at least second VMI (104).

At 806, the fault tolerance service 120 may detect a failure of the at least second VMI (104), and may re-launch the at least one data storage node (as DSN 302) on at least a third VMI (e.g., VMI 114) running on the one or more servers. At 808, the fault tolerance service 120 may attach the network storage (118) to the at least third VMI (114). At 810, the fault tolerance service 120 may cause the DMN 112 to access the file data from the network storage (DSN 302) attached to the at least third VMI (114). The at least third VMI (114) may be replacing the failed at least second VMI (104) to provide fault tolerance in the distributed file system.

Figure 9:
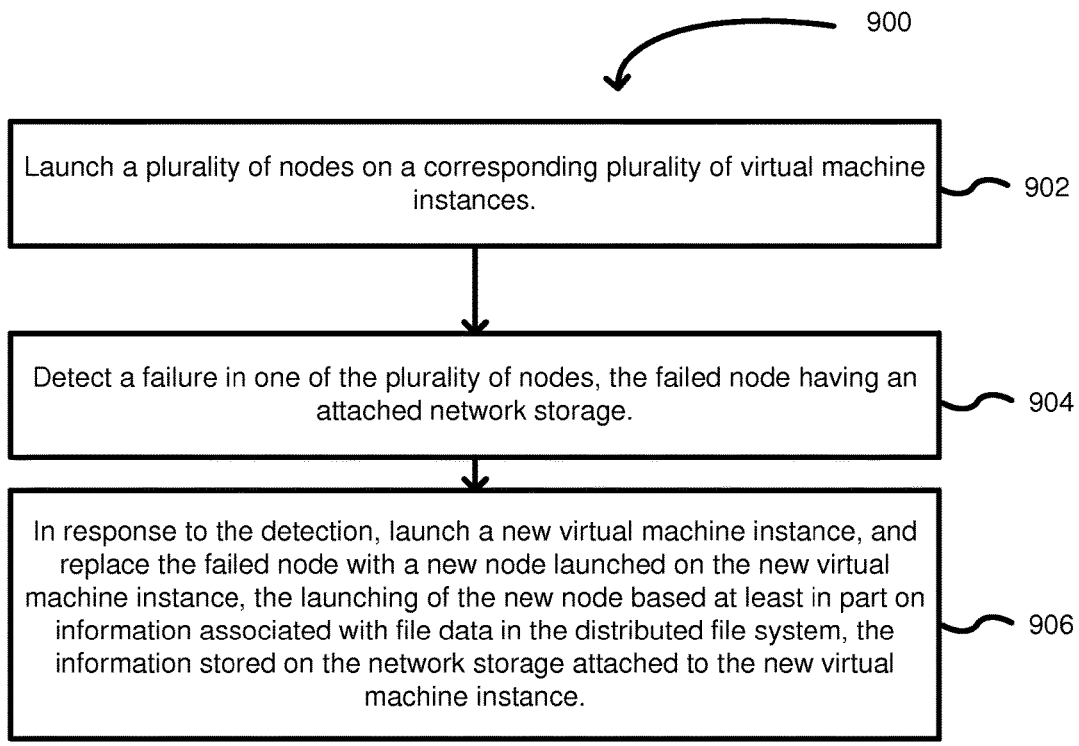

FIG. 9 is a flowchart of another example method of providing fault tolerance in a distributed file system of a service provider, in accordance with an embodiment of the disclosure. Referring to FIGS. 1-3 and 9, the example method 900 may start at 902, when the fault tolerance service 120 may launch a plurality of nodes on a corresponding plurality of virtual machine instances. For example DSNs 106, . . . , 108 may be launched on VMIs 102, . . . , 104, and DMN may be launched on VMI 110. At 904, the fault tolerance service 120 may detect a failure in one of the plurality of nodes, the failed node having an attached network storage (e.g., 118). For example, the fault tolerance service 120 may detect a failure of DMN 112 (as explained in reference to FIG. 1) or may detect failure of DSN 108 (as explained in reference to FIG. 3). At 906, in response to the detection, the fault tolerance service 120 may launch a new virtual machine instance. For example, the fault tolerance service 120 may launch VMI 114 (as seen in both FIGS. 1 and 3). The fault tolerance service 120 may then replace the failed node (112 in FIG. 1 or 108 in FIG. 3) with a new node (116 or 302) launched on the new virtual machine instance based at least in part on information (e.g., metadata files 122 in FIG. 1 or file data segments 304 in FIG. 3) associated with file data in the distributed file system. The information (e.g., metadata files 122 in FIG. 1 or file data segments 304 in FIG. 3) may be stored on the network storage (e.g., 118) attached to the new virtual machine instance (118 being attached to the failed VMI prior to detecting the failure, and being re-attached by the fault tolerance service 120 to the newly launched instance 114 after the failure is detected).

Figure 10:
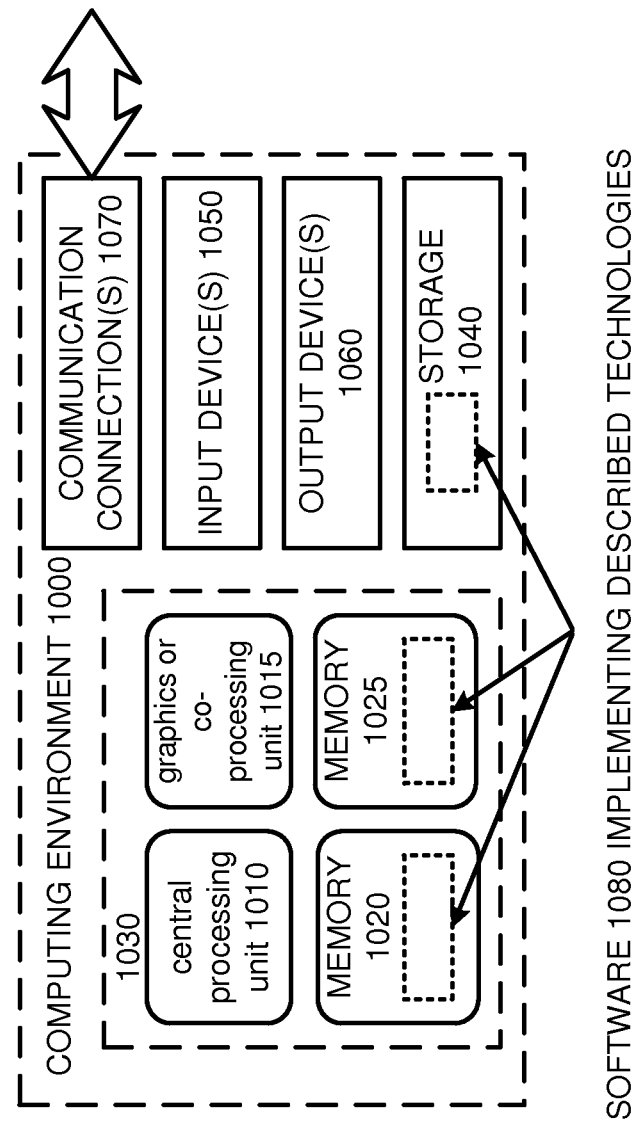
FIG. 10 depicts a generalized example of a suitable computing environment in which the described innovations may be implemented.

FIG. 10 depicts a generalized example of a suitable computing environment in which the described innovations may be implemented. Referring to FIG. 10, the computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations (e.g., functionalities) described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a customer-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method for providing fault tolerance in a distributed file system of a service provider, the method comprising:
    launching at least one data storage node on at least a first virtual machine instance (VMI) running on one or more servers of the service provider, the at least one data storage node storing file data of the distributed file system;
    launching at least one data management node on at least a second VMI running on the one or more servers of the service provider, wherein the at least second VMI is associated with a dedicated IP address and the at least one data management node is configured to store metadata information associated with the file data in a network storage attached to the at least second VMI; and
    upon detecting a failure of the at least second VMI:
        re-launching the at least one data management node on at least a third VMI running on the one or more servers;
        attaching the network storage to the at least third VMI;
        associating the dedicated IP address with the at least third VMI; and
        retrieving the stored metadata information by the at least one data management node running on the third VMI, wherein the at least third VMI is replacing the failed at least second VMI to provide fault tolerance in the distributed file system.

2. The method according to claim 1, wherein the metadata information comprises file system metadata and a command log, and wherein the file system metadata comprises, for each file in the file data, at least one of:
    a file name of the file;
    a file checksum of the file;
    information identifying one or more file blocks of the file;
    information identifying how many times the one or more file blocks are replicated;
    information identifying one or more file directories storing each of the file blocks; or
    information identifying one or more of the at least one data storage nodes hosting the identified one or more file directories.

3. The method according to claim 2, wherein the command log comprises at least one instruction for updating the file system metadata and the method further comprises:
    upon re-launching the at least one data management node on the at least third VMI, checkpointing the metadata information by updating the file system metadata based on the at least one instruction in the command log; and
    resetting the command log file after the checkpointing by deleting the at least one instruction.

4. The method according to claim 1, comprising:
    upon launching the at least one data management node on the at least second VMI, mounting the network storage as an external volume attached to the at least second VMI.

5. The method according to claim 1, comprising:
    storing an address associated with the at least one data management node in a configuration record for the at least one data storage node, wherein the address comprises the dedicated IP address.

6. The method according to claim 1, wherein detecting the failure of the at least second VMI comprises:
    in response to the at least one data management node receiving at least one instruction associated with the file data, detecting inactivity by the at least one data management node for a duration of time.

7. The method according to claim 1, wherein:
    the distributed file system is a Hadoop distributed file system;
    the at least one data storage node is a Hadoop DataNode; and
    the at least one data management node is a Hadoop NameNode.

8. A system for providing fault tolerance in a distributed file system of a service provider, the system comprising:
    a plurality of host server computers coupled together through a network to form the service provider, at least a portion of the host server computers for executing a plurality of virtual machine instances associated with a customer account; and
    a fault tolerance service operable to:
        launch at least one data storage node on at least a first virtual machine instance (VMI) running on at least one of the host server computers, the at least one data storage node storing file data of the distributed file system;
        launch a data management node on at least a second VMI running on the at least one of the host server computers, wherein the data management node stores metadata information associated with the file data in a network storage attached to the at least second VMI; and
        upon detecting a failure of the at least second VMI, re-launching the data management node on at least a third VMI running on the at least one of the host server computers and attaching the network storage to the at least third VMI, wherein the at least third VMI is replacing the failed at least second VMI to provide fault tolerance in the distributed file system.

9. The system according to claim 8, wherein:
    the second VMI is associated with a dedicated IP address associated with the customer account; and
    upon detecting the failure, the fault tolerance service is operable to associate the dedicated IP address with the at least third VMI.

10. The system according to claim 8, wherein:
    the second VMI is associated with a first non-dedicated IP address; and upon re-launching the data management node, the fault tolerance service is operable to:
  associate the third VMI with a second non-dedicated IP address; and
  store the second non-dedicated IP address in a configuration record for the at least one data storage node, the configuration record stored at the at least one data storage node and used for accessing the data management node.

11. The system according to claim 10, wherein the configuration record further comprises at least one of a protocol, a host name, or an access port associated with the data management node.

12. The system according to claim 8, wherein the fault tolerance service is operable to:
  upon launching the data management node on the at least third VMI, disconnect the network storage from the at least second VMI, and mount the network storage as an external volume attached to the at least third VMI.

* * * * *